United States Patent
Terashima et al.

[19]

[11] Patent Number: 5,970,419
[45] Date of Patent: Oct. 19, 1999

[54] PORTABLE WIRELESS COMMUNICATIONS UNIT AND LIGHTING CONTROL METHOD THEREOF

[75] Inventors: Kazuhiko Terashima; Takaki Nakazawa, both of Tokyo, Japan

[73] Assignee: Sony Corporation, Tokyo, Japan

[21] Appl. No.: 08/818,550

[22] Filed: Mar. 14, 1997

[30] Foreign Application Priority Data

Mar. 19, 1996 [JP] Japan .................................. 8-090556

[51] Int. Cl.⁶ .................................................. H04Q 7/20
[52] U.S. Cl. .................... 455/566; 455/38.3; 455/343; 455/127
[58] Field of Search ........................ 455/38.3, 90, 127, 455/343, 403, 550, 566, 574, 575; 327/544

[56] References Cited

U.S. PATENT DOCUMENTS

| 4,675,863 | 6/1987 | Paneth et al. ............................ 455/574 |
| 5,487,181 | 1/1996 | Dailey et al. ............................. 455/90 |

FOREIGN PATENT DOCUMENTS 408138153  5/1996  Japan .
409261108  10/1997  Japan .

Primary Examiner—Dwayne D. Bost
Assistant Examiner—Nay A. Maung
Attorney, Agent, or Firm—Jay H. Maioli

[57] ABSTRACT

A backlight for a liquid crystal display in TMDA type portable telephones is driven by PWM. A register for holding the PWM-drive pulse width setting values and a decoder for decoding counted values in a base counter for counting the basic timing of three slots for receive, idle and transmit. A lighting control circuit Scb is provided to cut off the supply of power to the backlight incandescent lamp from the secondary battery during the transmit time slot. The power cutoff period by means of the Scb signal may be extended beyond the transmit time slot depending on the voltage detected at the secondary battery terminal by means of a voltage sensor circuit. Consequently additional voltage drops in a battery can be avoided during transmission in a TMDA type portable telephone by switching off a light such as a backlight for a liquid crystal display.

14 Claims, 5 Drawing Sheets

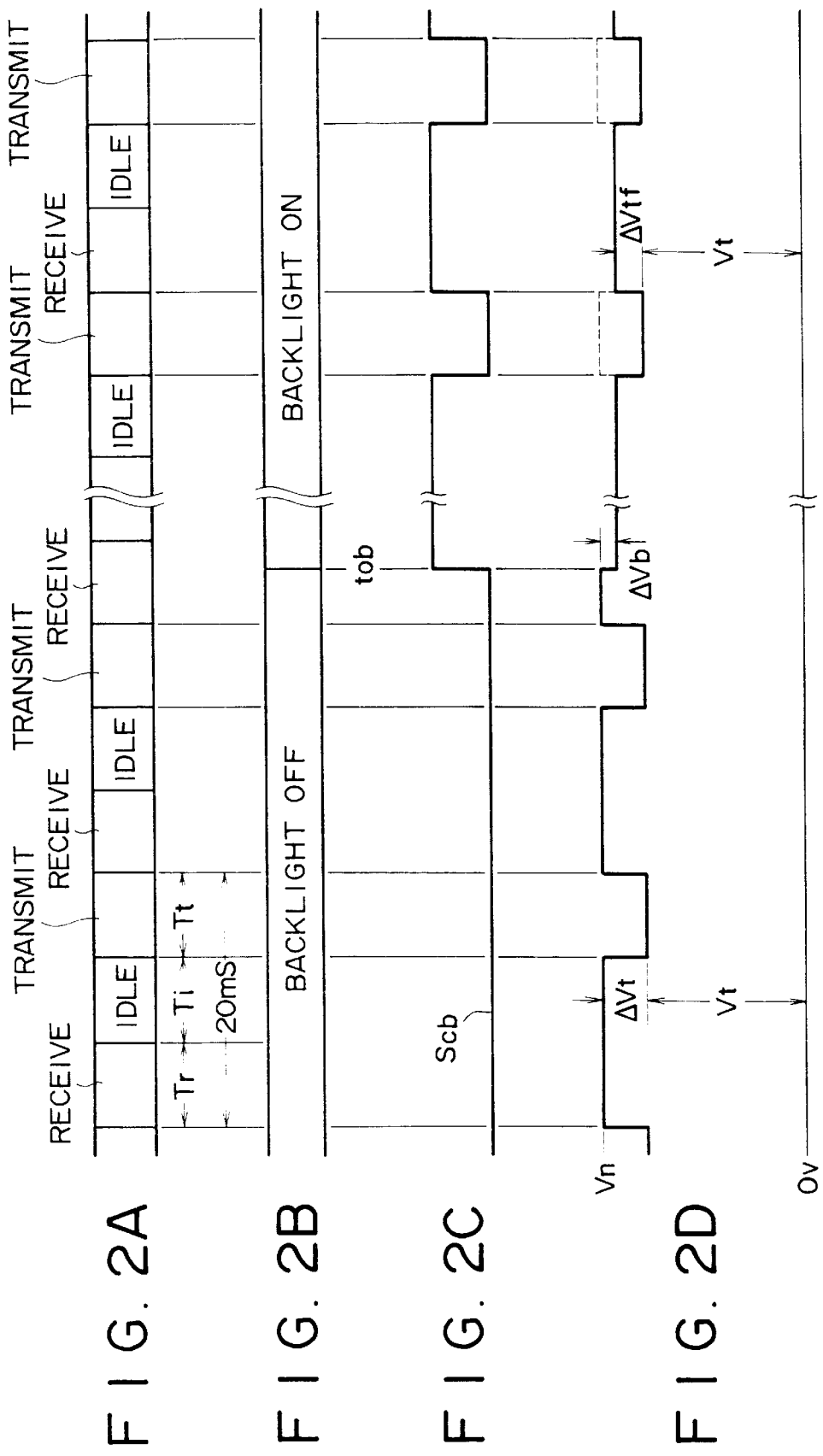

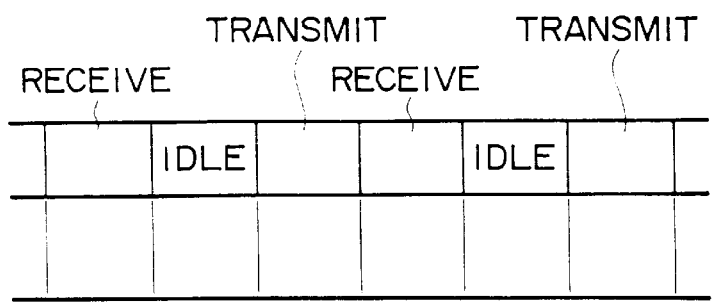
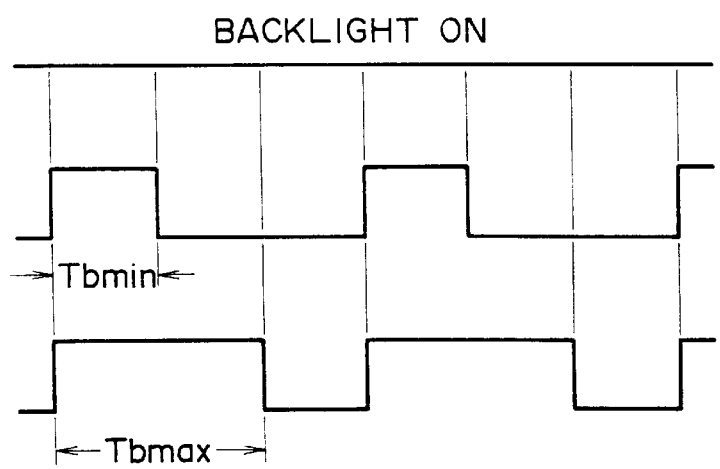
FIG. 4
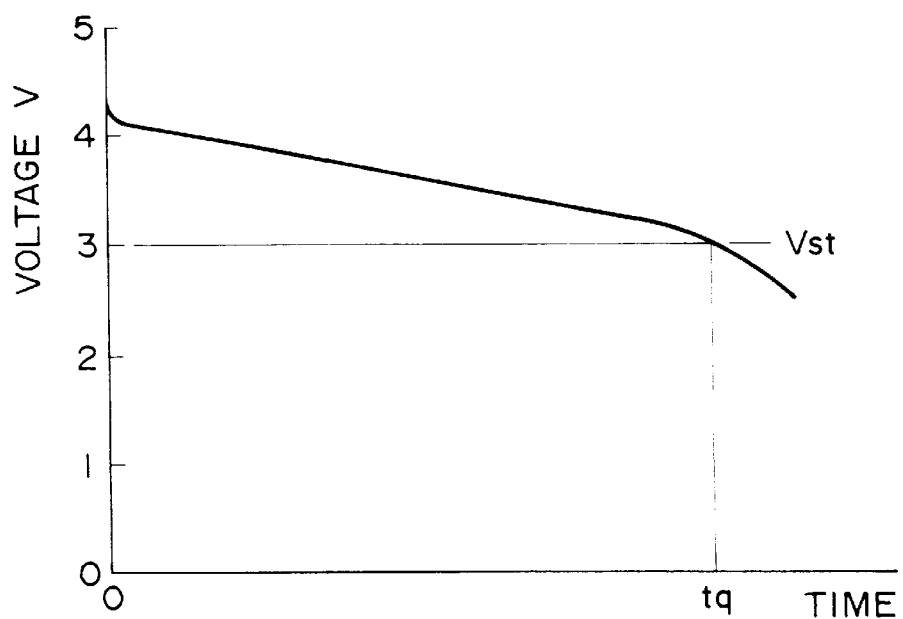

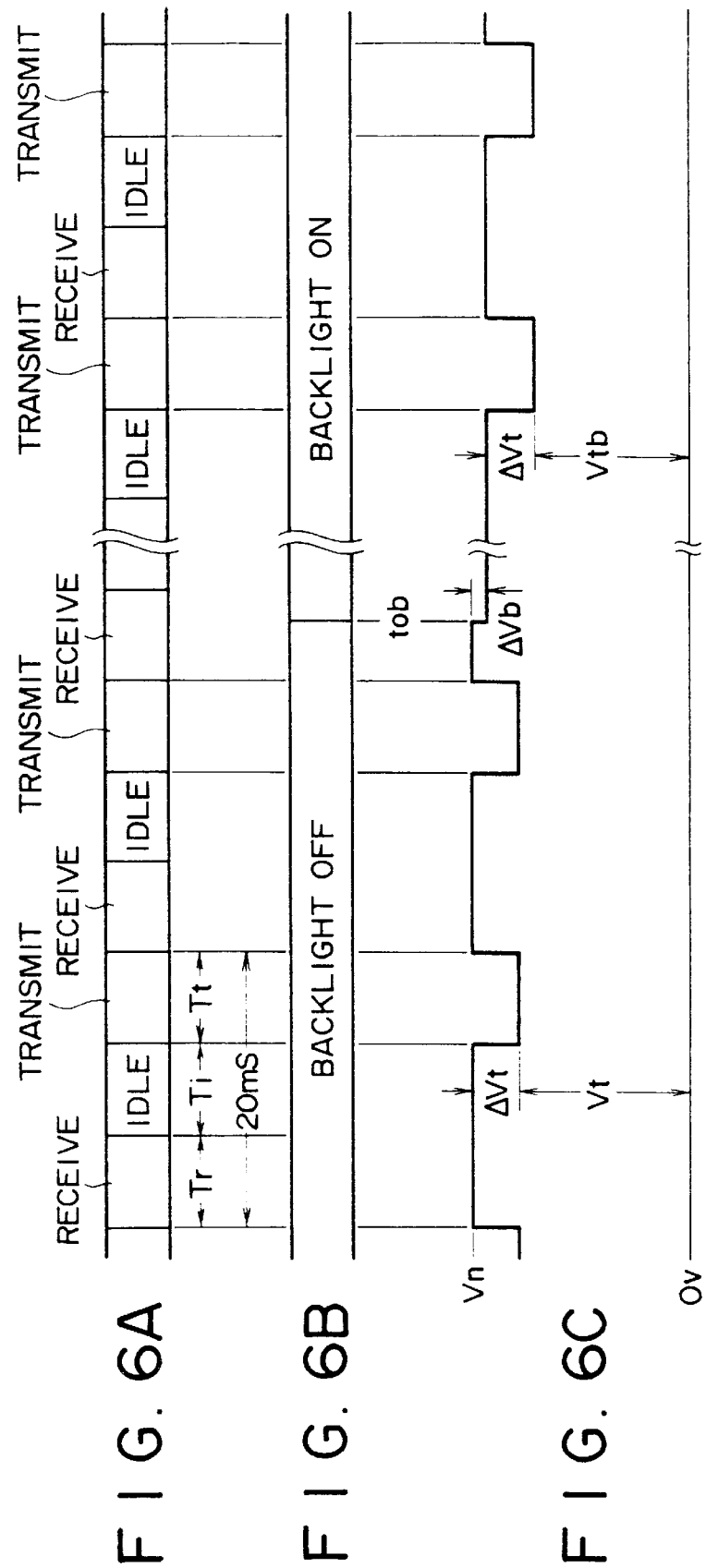

PORTABLE WIRELESS COMMUNICATIONS UNIT AND LIGHTING CONTROL METHOD THEREOF

BACKGROUND OF THE INVENTION

1. Field of the Invention

This invention relates to a portable type wireless communications unit using a battery as the power supply and a lighting control means thereof.

2. Description of Related Art

In the prior art, portable telephones such as cellular phones can be freely used in a wide variety of locations and are therefore extremely useful for business and other situations.

This portable telephone incorporates a secondary battery and connects the user to the nearest base station by means of wireless communication in the UHF band thus providing a comparatively wide range of movement. The audio signal of the telephone is digitally processed and transmitted with its time axis and amount of data compressed.

A portable telephone as described above has an outer appearance as shown for instance in FIG. 5.

In a portable telephone 10 shown in FIG. 5, a receiving antenna 11 is installed at the upper part of the case 10c. A speaker 12 and microphone 13 are installed at the top and respectively bottom of the front of the case 10c. A plurality of dial keys 14 and a plurality of function keys 15a through 15m are provided between the speaker 12 and microphone 13. A display 16 utilizing a liquid crystal display element is provided.

This liquid crystal display 16 shows information on the display such as used for instance in a telephone book function to search for telephone numbers, provides good visibility by means of a source of light such as a backlight, in which the display is illuminated from the rear. The light source for this backlight is an incandescent lamp or a light emitting diode.

The dial keys 14 and the function keys 15a through 15m each incorporate a light emitting diode for display illumination. These keys light up when the power is turned on and are easily visible even in dark locations.

The power supply for the portable telephone of the prior art is generally nickel-cadmium storage batteries or nickel-hydrogen storage batteries. Recently, however lithium-ion storage batteries having higher capacity and higher energy density are being used.

These lithium-ion batteries have a nominal voltage of 3.6 volts which is three times higher than the 1.2 volts (nominal) of nickel-cadmium or nickel-hydrogen batteries. The number of recharge cycles is also 1200 times that of nickel-cadmium or nickel-hydrogen batteries yielding a battery life more than twice as long as the 500 hours of nickel-cadmium or nickel-hydrogen batteries.

Discharge characteristics of lithium-ion batteries as shown in FIG. 4 have a steeper slope than nickel-cadmium or nickel-hydrogen batteries as can be seen in FIG. 4 along with a monotone decrease characteristic.

The compactness and light weight of these portable telephones places limits on the capacity of their internalized secondary batteries so that these portable telephones usually incorporate a battery voltage sensor circuit. In the final stages of secondary battery life it becomes difficult to supply the required stable voltage Vst for the circuits that provide a load on the battery. This is the so-called "LOW BATTERY" condition and an alarm is issued just before this stage is reached. The user responds to this alarm by charging or replacing the secondary battery.

These portable telephones connect many users with their respective parties while utilizing the same frequency band. In order to prevent each pair of callers from interfering with other callers, a system called time-division multiple access (TDMA) is employed which segments the calling time per each user to allow common use on the same frequency.

In this TMDA system, transmit and receive is performed by time sharing or time division. Restated, the audio data is placed on a time base and the quantity of data compressed, and the transmit data (base band signal) is then generated in bursts. The transmit signal modified by this transmit data is assigned to a transmit slot of specified timing and then sent while the receive signal from the other party is received by a receive slot which is separate from the transmit slot.

An idle slot is present between the receive slot and the transmit slot as shown in FIG. 6A. Receive and transmit on the portable telephone is performed repeatedly while segmented according to time. The time lengths for the transmit slots Tr, Ti and Tt are for instance set equally and the repeat interval is set for instance to 20 milliseconds.

The secondary battery internalized in the portable telephone puts limits on its own capacity due to the compactness and light weight of the portable telephone. During transmit, when power consumption is greatest, a voltage drop occurs in the secondary battery due to internal resistance.

First of all, operation prior to the time point tob is illustrated in FIG. 6B. In the interval where the power for the background light is "OFF" the power consumption is comparatively small at the receive slots and idle slots, and as shown in FIG. 6C, the secondary battery voltage becomes Vn. The secondary voltage at the transmit slot drops to:

$$Vt = Vn - \Delta Vt$$

Here, $\Delta Vt$ is the internal voltage drop versus power consumption during transmit.

At the time point tob within the receive or the idle slot in FIG. 6B, when the backlight power source for the liquid crystal display 16 changes from 'OFF' to 'ON' all slots from the time point tob have an internal voltage drop $\Delta Vb$ in response to the power consumption from the backlight power source as shown in FIG. 6 when the backlight power source is at 'ON' the secondary battery terminal voltage at the transmit slot drops to $$Vtb = Vn - \Delta Vt - \Delta Vb$$

This current consumption may reach for instance one ampere during transmit. Current consumption may climb another 50 to 60 milliamps due to lighting of the backlight for the liquid crystal display 16.

As can be seen therefore in the portable telephone of the prior art, when the backlight light source is at the ON interval during the transmit slot, an internal voltage drop $\Delta Vb$ is added to the internal power consumption $\Delta Vt$ during transmit due to power consumption by the backlight, so that the voltage at the terminals of the secondary battery is even lower than when the backlight source is in the OFF interval.

During initial discharge of the secondary battery as shown in FIG. 4, the voltage required at the battery terminals is sufficiently higher than Vst so that even if lighting of the backlight coincides with operation of the transmit circuit, the voltage at the secondary battery terminals will not drop down to the threshold voltage where the battery voltage sensor will trigger a "LOW BATTERY" alarm.

However in the final stages of secondary battery discharge when the lighting such as for a backlight coincides with transmit circuit operation, the voltage at the secondary battery terminals will drop down to this threshold voltage, and the battery voltage sensor will mistake this for a "LOW BATTERY" condition.

Further, as shown in FIG. 4, when using a secondary battery having the monotone decrease characteristic, portable telephones of the prior art have the problem of a difference in backlight brightness depending on whether the secondary battery is in the initial or final stages of discharge.

SUMMARY OF THE INVENTION

In view of the above problems, it is an object of this invention to provide a portable type wireless communications unit and lighting control means thereof that does not have a voltage drop at the terminals of the secondary battery due to the backlight ON interval coinciding with the time that the transmit circuit is operating and further, maintains a fixed brightness level for the backlight for secondary batteries having a monotone decrease characteristic regardless of whether the secondary battery is in the initial or final stages of discharge.

In order to solve the above mentioned problems, the portable type wireless communications unit of this invention is a portable type wireless communications unit using a battery as a power supply and provided with lighting means and transmission and reception are performed in a time sharing operation, wherein;

In the time sharing operation control means regulates the switching on of a light for cutting off the electrical current from the battery to the lighting means in synchronization with the time sharing operation so that electrical current from the battery to the lighting means is cut off for at least the duration of the transmit interval.

Control of lighting for the lighting means is provided by a Pulse Width Modulator (PWM) signal. Electrical current is not supplied to the lighting means during the transmit interval. Therefore a voltage drop due to current flowing from the lighting means will not occur during the transmit interval even if the light is on due to the lighting means.

Further, the portable type wireless communications unit of this invention as described is provided with timing control means for regulating time sharing operation during the transmit interval and the receive interval and, the lighting control means is characterized by holding means for retaining on-off ratio settings of the electrical current from the battery to the lighting means, lighting drive means for controlling electrical current supplied to the lighting means based on settings from said holding means, and from timing data from the timing control means voltage a sensor circuit to detect voltage at the terminal of the battery and, means for setting changing the holding means for the lighting control means according to the voltage detected by this voltage sensing circuit.

The portable type wireless communications unit of claim 2 makes use the battery voltage to regulate changes so that for instance when the battery voltage is high, the pulse width of the PWM signal supplied by the lighting means narrows and when the battery voltage is low, the pulse width of the PWM signal supplied by the lighting widens. This allows the brightness of the lighting means to remain at a fixed level regardless of the size of the voltage.

Therefore, this invention as described above, will not have varying voltage drops at the terminals of the secondary battery due to lighting up of the backlight, even when the lighting interval of the backlight coincides with the transmit circuit operation interval. Further, this method of this invention prevents detection of the battery voltage as a "LOW BATTERY" condition when the battery voltage is at or above the threshold voltage.

Also, when the secondary battery has a monotone decrease characteristic, the method of this invention maintains a fixed brightness for the backlight, both in the initial and final stages of battery discharge

BRIEF DESCRIPTION OF THE DRAWINGS

FIG. 2 is a timing chart describing the operation of an embodiment of this invention.

FIG. 3 is a timing chart describing the operation of an embodiment of this invention.

FIG. 4 is a graph showing battery discharge characteristics of the portable type wireless communications unit of this invention.

FIG. 6 is a timing chart describing the operation of the prior art.

DETAILED DESCRIPTION OF THE PREFERRED EMBODIMENT

Hereafter, an embodiment of the portable type wireless communications unit of this invention as applicable to digital cellular phones, will be described while referring to FIG. 1 through FIG. 3.

Structure of the Embodiment

Figure 1:
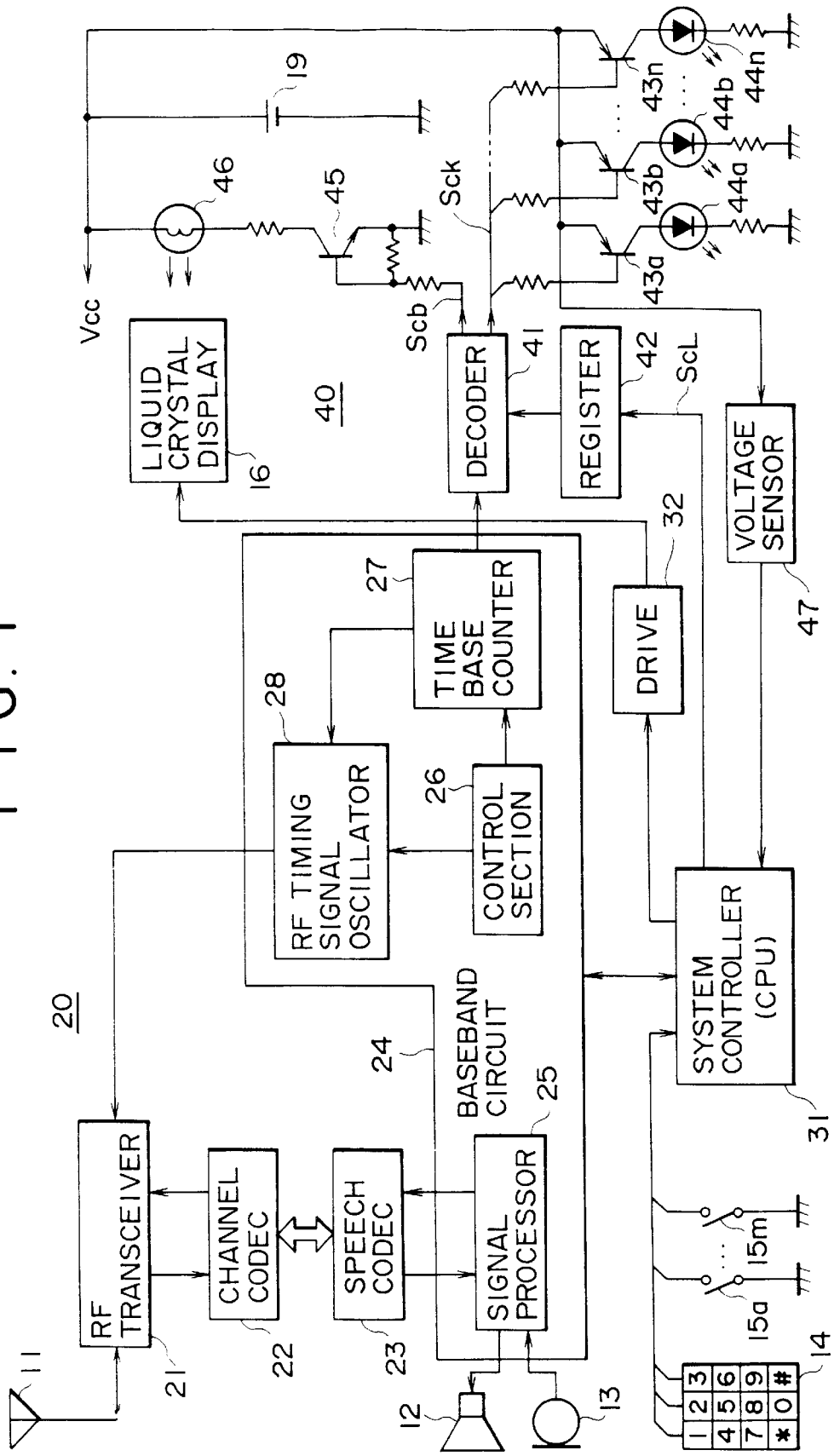
FIG. 1 is a block diagram showing the structure of an embodiment of the portable type wireless communications unit of this invention.
Figure 5:
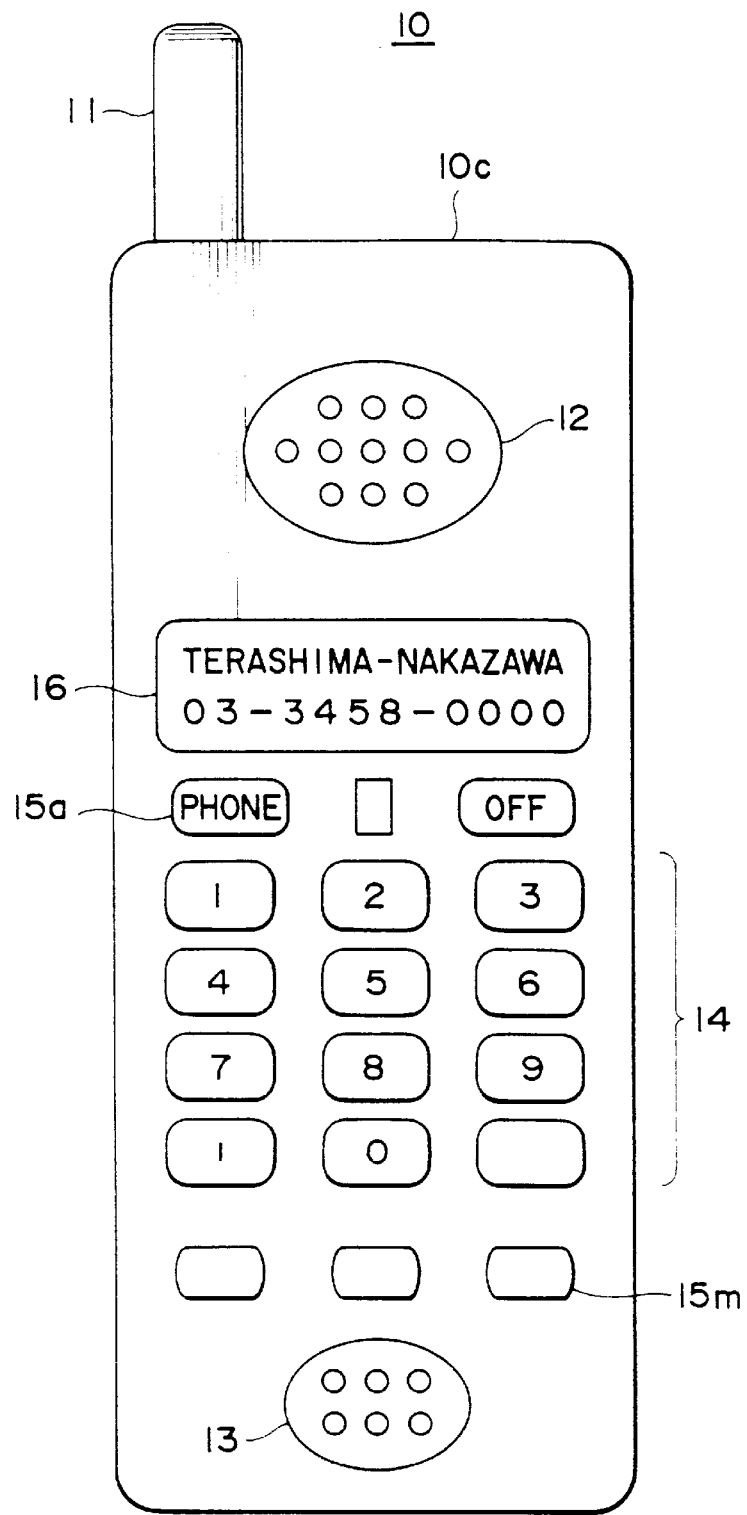
FIG. 5 is a front view of the portable type wireless communications unit of this invention.

FIG. 1 shows the structure of an embodiment of this invention. FIG. 1 uses the same reference numerals as previously mentioned for FIG. 5.

A communications system for the portable telephone in FIG. 1 is comprised of a channel codec circuit 22, a speech codec circuit 23 and a baseband circuit 24.

This baseband circuit 24 is comprised of a signal processor 25 and a control section 26 as well as a time-base counter 27 and an RF timing signal oscillator circuit 28 controlled by the control section 26. The baseband signals such as the audio signals and data are processed for transmit or receive and exchanged back and forth with an RF transceiver circuit 21 by way of the speed codec circuit 23 and the channel codec circuit 22.

An antenna 11 for both transmit and receive is connected to the RF transceiver circuit 21, and a speaker 12 and a microphone 13 are connected to the signal processor 25 of the baseband circuit 24. The time base counter 27 counts the basic timing for the receive, idle and transmit slots which repeat in 20 millisecond periods as previously shown in FIG. 6. Control of the timing for the RF transceiver circuit 21 is performed by way of the RF timing signal oscillator 28.

The system controller (CPU) 31 to which the output signals from the dial keys 14 and the function keys 15a through 15m are supplied, also sends and receives control signals such as call status signals with the baseband circuit 24.

The display information from the CPU 31 is supplied to the liquid crystal display 16 by way of the drive circuit 32.

The lighting control system 40 of this embodiment is comprised of a decoder 41 and a register 42. The lighting control information ScL relating to the dial keys 14, the function keys 15a through 15m, and the liquid crystal display 16 supplied from CPU 31 are stored in this register 42 along with settings for lighting on-off time comparisons.

The outputs from the time base counter 27 are supplied to the decoder 41 along with storage data supplied from the register 42. Based on this information, the operating keys 14, 15a through 15m as well as the liquid crystal display 16 lighting control signals ScK and Scb are output from the decoder 41. These control signals ScK and Scb are configured in a complementary inverted phase.

The lighting control signal Sck is supplied to the base of the pnp transistors 43a through 43n. The emitters of the transistors 43a through 43n are all connected to the secondary battery 19 which serves as the power supply. The collectors of the transistors 43a through 43n are connected to ground potential through the light emitting diodes 44a through 44n.

These light emitting diodes 44a through 44n each correspond to the dial keys 14 and the function keys 15a through 15m. When the control signal Sck supplied to any of the bases of the transistors 43a through 43n from the decoder 41, is at a low level, the current flow through the collector turns on the light emitting diode.

The other control signal Scb is supplied to the base of the npn transistor 45. An incandescent lamp 46 is connected between the collector of the transistor 45 and the secondary battery 19 as the backlight light source for the liquid crystal display 16.

This incandescent lamp 46 is turned on by current flow through the collector of the transistor 45 when the lighting control signal Scb supplied to the base of the transistor 45 reaches a high level.

In the configuration of this embodiment, the lighting control signal Sck is for the dial keys 14 and the function keys 15a through 15m, while the other lighting control signal Scb is for the call status signals.

The voltage sensor circuit 47 connects to the secondary battery 19. This sensor output is sent to the CPU 31 and as explained previously, lighting control is performed according to the voltage at the terminal of the secondary battery 19.

This voltage sensor circuit 47 serves as a circuit to detect the previously explained "LOW BATTERY" condition.

An in-line regulator (not shown) is connected to the secondary battery 19 as a stabilized power supply and supplies specified voltages to each section.

Lighting Control Embodiment

An embodiment of the lighting control operation of this invention is explained next while referring to FIG. 2 and FIG. 3.

Hereafter, only the lighting control signal Scb for controlling the flashing of the incandescent lamp 46 will be described. The lighting control signal Sck for controlling the flashing of the light emitting diodes 44a through 44n will be omitted here and in the figures for the sake of simplicity since operation is generally the same as for the lighting control signal Scb.

As explained previously, the transmit and receive in this embodiment are each repeated through time sharing at 20 millisecond intervals by means of their respective time slots as shown in FIG. 2A. The backlight shifts from "OFF" to "ON" by means of the optional time point tob as shown in FIG. 2B, regardless of the transmit/receive timing.

In the backlight "OFF" interval prior to the time point tob as shown in FIG. 2D, the voltage at the terminals of the secondary battery 19 reaches Vn for the receive and idle slots, and at the same time the power consumption during transmit at the transmit slots will drop by an amount equal to the interval voltage drop ΔVt so that we obtain $$vt=Vn-\Delta Vt$$

In the backlight "OFF" interval prior to this time point tob in this embodiment as shown in FIG. 2C, the lighting control signal Scb from the decoder 41 is at low level for all slots.

Then, in the backlight "ON" interval after this time point tob, at the lighting control signal Scb, the transmit slots remain at a low level at the same time that the receive and idle slots reach a high level.

Due to this process, the lighting control signal Scb reaches a high level during the interval that the backlight is "ON" and the transistor 45 turns on for the receive and idle slots. The consequent collector current through the transistor 45 lights up the incandescent lamp 46. As shown in FIG. 2D the voltage at the terminal of the secondary battery 19 is lower than Vn by an amount equal to the internal voltage drop ΔVb from current consumed by the backlight.

During the transmit slot at which this the lighting control signal Scb reaches a low level, the incandescent lamp will not light up even if this is the backlight "ON" interval since it was turned off by the transistor 46. Therefore as shown by the dotted line in FIG. 2D, there will be no internal voltage drop ΔVb resulting from current consumption by the backlight.

The voltage at the terminals of the secondary battery 19 for each transmit slot as shown by the solid line in FIG. 2D will be lower than the voltage at the terminals of the secondary battery 19, ΔVb-ΔVb for the receive and idle slots; by an amount equal to the internal voltage drop ΔVtf ΔVt-ΔVb) resulting from the difference in current consumption during transmit and use of the backlight etc.

Restated, during either the "ON" or "OFF" interval of the backlight of this embodiment, the voltage at the terminals of the secondary battery 19 for the transmit slots will be lower than Vn by the amount of the internal voltage drop ΔVt corresponding to the current consumption during transmit thus becoming $$Vt=Vn-\Delta Vt$$

So a further voltage drop due to an increase in current consumption from the lighting of the backlight will be avoided.

The duration of the transmit slot and repeating interval is relatively small as can be seen in FIG. 2A so that after the time point tob the user will be unable to observe flashing of the backlight which will appear continuously lit.

Also in this embodiment, in order to deal with the discharge characteristic of the previously related lithium-ion storage battery, the OFF interval of the backlight is increased or reduced, according to (low or high) values respectively of the voltage at the terminals of the secondary battery, in order to maintain essentially the same brightness of the background light, from the initial stages to the final stages of discharge.

In this case, the control signals from the CPU 31 are supplied to the register 42 based on the output from the voltage sensor circuit 47. These signals are stored in the register for changing the setting values for the on-off ratio (time comparison) for the flashing of the backlight.

The decode values of the decoder 41 are altered according to these changed settings, and then output from the decoder 41. The pulse width (share) of the pulse train for the specific period of the lighting control signal Scb is then increased or decreased according to low or high values respectively of the voltage at the terminals of the secondary battery 19.

As shown in FIG. 3A, transmit and receive are repeatedly performed through time-sharing for specified periods at the corresponding slots. As shown in FIG. 3B, the voltage at the terminals of the secondary battery 19 is high in the initial battery discharge stage in the interval where the backlight is "ON". In the interval where the lighting control signal Scb is a high level as shown in FIG. 3C, and for instance shorted as in Tbmin, the actual lighting time of the backlight is reduced.

As battery discharge progresses, the voltage at the terminals of the secondary battery 19 drops and the interval high level the lighting control signal Scb gradually extends (increases) from Tbmin.

In the final stages of battery discharge, as the voltage at the terminals of the secondary battery 19 drops near the limits of correct operation, the interval of the high level lighting control signal Scb gradually lengthens as for instance in Tbmax in FIG. 3D and the actual backlight lighting time is extended to the upper limit.

In the process of this embodiment therefore, not only is the brightness of the backlight essentially maintained at a fixed level from the initial to the final period of discharge of the secondary battery 19 regardless of fluctuations in battery voltage, but the current consumption is reduced as compared with the prior art which has a fixed lighting time.

The embodiment described above made use of an incandescent lamp as the light source. However light emitting diodes may be used also. The batteries of course need not be limited to the lithium-ion type.

Further, items used for lighting are not limited to the liquid crystal display backlight and the illuminated key lighting other types of lighting may be used.

What is claimed is:

1. A portable type wireless communications unit comprising:

a battery for supplying electrical current to said communications unit;

voltage sensing means for detecting a voltage at terminals of said battery;

lighting means to light said communications unit using said electrical current;

a transmission and a reception section for performing a time sharing operation; and lighting control means for regulating by said time sharing operation a periodic supply of said electrical current to said lighting means and for stopping the supply of electrical current for at least an interval of said transmission, wherein a duration of said interval during which the supply of said electrical current to said lighting means is stopped is controlled according to said voltage detected at said terminals of said battery.

2. The portable type wireless communications unit as claimed in claim 1, further comprising:

timing means for regulating said time sharing operation;

holding means for retaining an on-off impulse ratio setting of the electrical current in the lighting control means; and light drive control means for controlling the supply of electrical current based on timing information and a present value.

3. The portable type wireless communications unit as claimed in claim 2, further comprising:

means for changing the present value in the holding means according to said voltage detected at said terminals of said battery by said voltage sensing means.

4. The portable type wireless communications unit as claimed in claim 3, wherein a light off interval of said lighting means is increased or decreased by changing the present value.

5. The portable type wireless communications unit as claimed in claim 1, wherein said lighting means has a liquid crystal display element illuminated from a rear thereof.

6. The portable type wireless communications unit as claimed in claim 3, wherein a light off interval of said lighting means is made to change gradually in response to a drop in output voltage from said voltage sensing means.

7. The portable type wireless communications unit as claimed in claim 3, wherein a light off interval of said lighting means is regulated to be shortest at an end of a battery discharge interval.

8. A method of operating a portable type wireless communications unit, comprising the steps of:

supplying electrical current to a communications unit from a battery;

detecting a voltage at terminals of said battery using voltage sensing means;

lighting up a terminal with lighting means;

performing a time sharing operation with a transmission and a reception section; and regulating a periodic supply of said electrical current and the time sharing operation of a lighting control means so that the supply of electrical current to said lighting means is stopped for at least an interval of a transmission, wherein a duration of said interval during which the supply of said electrical current to said lighting means is stopped is controlled according to said voltage detected at said terminals of said battery.

9. The method of operating a portable type wireless communications unit as claimed in claim 8, further comprising the steps of:

regulating the time sharing operation by a timing means;

retaining an on-off impulse ratio setting of said electrical current in the lighting control means with a holding means; and controlling the supply of electrical current with a lighting control means based on timing information and a present value.

10. The method of operating a portable type wireless communications unit as claimed in claim 9, further comprising the steps of:

changing the present value in the holding means according to said voltage detected at said terminals of said battery.

11. The method of operating a portable type wireless communications unit as claimed in claim 10, further comprising the step of:

performing one of increasing and decreasing a interval of the lighting means with the present value.

12. The method of operating a portable type wireless communications unit as claimed in claim 8, further comprising the step of:

illuminating a liquid crystal display element from a rear thereof.

13. The method of operating a portable type wireless communications unit as claimed in claim 10, further comprising the step of:

gradually changing a light off interval of the lighting means in response to a drop in output voltage from said voltage sensing means.

14. The method of operating a portable type wireless communications unit as claimed in claim 10, further comprising the step of:

regulating a light off interval of the lighting means to be shortest at an end of a battery discharge interval.

* * * * *